United States Patent
Ciofini et al.

(10) Patent No.: US 8,726,672 B2
(45) Date of Patent: May 20, 2014

(54) COOLING SYSTEM FOR A GAS TURBINE AND CORRESPONDING OPERATION METHOD

(75) Inventors: Maurizio Ciofini, Pieve al Toppo (IT); Stefano Rossin, Pistoia (IT); Roberto DeProsperis, Florence (IT)

(73) Assignee: Nuovo Pignone S.p.A., Florence (IT)

( * ) Notice: Subject to any disclaimer, the term of this patent is extended or adjusted under 35 U.S.C. 154(b) by 461 days.

(21) Appl. No.: 12/888,484

(22) Filed: Sep. 23, 2010

(65) Prior Publication Data
US 2011/0072827 A1 Mar. 31, 2011

(30) Foreign Application Priority Data

Sep. 25, 2009 (IT) ................ CO2009A0034

(51) Int. Cl.
*F02C 6/08* (2006.01)

(52) U.S. Cl.
USPC .............................................. 60/782; 60/806

(58) Field of Classification Search
CPC ................ F02C 6/08; F02C 7/12; F02C 7/18; F02C 7/185
USPC ............................. 60/262, 782, 784, 785, 806
See application file for complete search history.

(56) References Cited

U.S. PATENT DOCUMENTS

| | | | |
|---|---|---|---|
| 4,424,668 A | 1/1984 | Mukherjee | |
| 6,161,385 A | 12/2000 | Rebhan et al. | |
| 6,398,491 B1 | 6/2002 | Joos et al. | |
| 6,416,279 B1 | 7/2002 | Weigand et al. | |
| 6,615,574 B1 * | 9/2003 | Marks | 60/772 |
| 6,640,550 B2 | 11/2003 | Hoffmann et al. | |
| 6,983,602 B2 | 1/2006 | Senile | |
| 7,143,573 B2 | 12/2006 | Hoffmann et al. | |
| 2003/0046938 A1 * | 3/2003 | Mortzheim et al. | 60/782 |
| 2004/0025491 A1 | 2/2004 | Hoffmann et al. | |
| 2007/0125092 A1 * | 6/2007 | Wolfe et al. | 60/782 |

(Continued)

FOREIGN PATENT DOCUMENTS

| | | |
|---|---|---|
| CN | 100365249 C | 1/2008 |
| CN | 101514818 A | 8/2009 |

(Continued)

OTHER PUBLICATIONS

Search Report dated May 5, 2010 for Italian application CO2009A000034 filed on Sep. 25, 2009.

(Continued)

*Primary Examiner* — Phutthiwat Wongwian
(74) *Attorney, Agent, or Firm* — Global Patent Operation

(57) ABSTRACT

An operation method for a gas turbine is provided which includes compressing a working fluid by a compressor, feeding this compressed working fluid into at least one combustion chamber where it is overheated, expanding this overheated working fluid in at least one expansion turbine to produce energy, carrying out a first tapping of the compressed work fluid from the compressor to feed it into a first cavity of the turbine for cooling, carrying out a second tapping of the working fluid downstream from the first tapping to feed it into a second cavity of the turbine upstream from the first cavity, for cooling, and fluidly connecting the first tapping to the second tapping to selectively feed the first tapping by a part of the second tapping during partial load operation conditions to keep the temperature of the first cavity within the acceptable limits for the resistance of the materials.

4 Claims, 3 Drawing Sheets

FIG. 1B

(56) References Cited

U.S. PATENT DOCUMENTS

| | | |
|---|---|---|
| 2007/0243811 A1 | 10/2007 | Alecu et al. |
| 2008/0014078 A1 | 1/2008 | Suciu et al. |
| 2009/0104020 A1 | 4/2009 | Roush et al. |
| 2009/0205310 A1 | 8/2009 | Hibshman, II et al. |
| 2010/0154434 A1 | 6/2010 | Kubota et al. |
| 2010/0286889 A1* | 11/2010 | Childers ............... 701/100 |
| 2012/0117977 A1* | 5/2012 | Childers et al. ........... 60/782 |

FOREIGN PATENT DOCUMENTS

| | | |
|---|---|---|
| DE | 19907907 A1 | 8/2000 |
| DE | 102008037481 A1 | 4/2009 |
| EP | 0684369 A1 | 11/1995 |
| EP | 1028230 A1 | 8/2000 |
| JP | 64-045926 | 2/1989 |
| WO | 2010016159 A1 | 2/2010 |

OTHER PUBLICATIONS

EP10178721, European Search Report and Written Opinion, Nov. 18, 2010.

CN Office Action dated Nov. 28, 2013 from corresponding CN Application No. 201010298593.6 (English translation to follow).

* cited by examiner

COOLING SYSTEM FOR A GAS TURBINE AND CORRESPONDING OPERATION METHOD

BACKGROUND OF THE INVENTION

1. Field of Invention

The present invention concerns a method and its respective cooling system for a gas turbine; the invention also concerns a gas turbine comprising this cooling system.

2. Description of the Prior Art

A gas turbine comprises—in its main features—an axial compressor, several combustion chambers and an expansion turbine, enclosed within a pressurized box. Air from the atmosphere enters into the compressor and is compressed to be fed into the combustion chamber, where it reacts with a combustible to form a gas at high temperature (typically around 1000-1300° C.); the hot gas is then fed into the expansion turbine along an expansion course where it expands activating blades to transform its own thermal energy into mechanical energy.

In general, the materials with which the combustion chamber is built need a powerful cooler to avoid breakage. They are subjected to extremely high temperatures in this area of the machine. The cooling of the expansion turbine components directly subjected to the high temperature gas is also particularly critical for the efficiency and reliability of the machine.

In fact, the turbine's maximum distributable power basically depends on the maximum temperature attainable by the process gas which is substantially limited by the resistance of the materials of which the components in direct contact with the gas are made.

It is therefore extremely important to correctly cool these components to increase the maximum distributable power while decreasing the probability of breakage, which would be potentially catastrophic for the machine.

Note that the temperature of the process gas decreases along the expansion course, on which the components subjected to the highest temperatures are arranged upstream from the expansion course in proximity with the combustion chamber. In fact, if these components are not cooled, they deteriorate much faster than components not directly subjected to the hot gas, even when made with special materials with or without thermal barriers.

In particular, given the importance of these components arranged upstream from the expansion course, cooling techniques have been developed which are especially refined and at the same time costly to produce and maintain, such as film cooling, impingement, the use of forced turbulence or appropriate thermal barriers among others, as is well known by experts in the field.

Also note that the cooling system for components directly subjected to the gas at the highest temperature in general contributes to the regulation of the flow of cooling air; yet, to modify the cooling of one of these components, it is often necessary to make substantial modifications to the system or substitute the components; resulting therefore in increased maintenance and renovation costs.

On the other hand, there are components and areas of the expansion turbine that are not directly subjected to the process gas, and generally they do not require special materials for their construction and, if they are not cooled, they deteriorate less rapidly than the components directly subjected to the process gas. These components are therefore less critical and therefore the techniques used for their cooling are simpler and less expensive.

Currently then, despite technology developments, it is problematic and there is a need to make gas turbines that have ever-improving performance at relatively limited costs; these machines being projected in general to have better performance and resist the maximum temperatures attainable during full load operation conditions.

SUMMARY OF THE INVENTION

This invention has the purpose of making some improvements to a cooling system for a gas turbine to overcome at least some of the disadvantages mentioned above.

Particular purposes of the invention are given by the fact of carrying out a method and its relative cooling system for a gas turbine to the degree of improving the cooling of certain components or areas of the machine during specific operation conditions. These purposes and benefits are obtained in essence with a functioning method following claim 1, with a cooling system following claim 4 and with a gas turbine following claim 7.

Following a first aspect, a functioning method for a gas turbine including at least the following stages is the object of the invention: compressing a working fluid by means of a compressor; feeding this compressed working fluid in at least one combustion chamber where it is overheated; expanding this overheated working fluid in at least one expansion turbine to produce energy; carrying out at least a first tapping of the compressed working fluid from the compressor to feed it into a first cavity of the expansion turbine for cooling; carrying out a second tapping of the working fluid downstream from the first tapping to feed it into at least a second cavity of the expansion turbine placed upstream from the first cavity, for cooling; and fluidly connecting the first tapping to the second tapping to selectively feed the first tapping by means of a part of the second tapping during partial load operation conditions to keep the temperature of the first cavity within the acceptable limits for the resistance of the materials.

In the sphere of the present description and the attached claim for "cavity of the expansion turbine" it is intended all the cavities or blades that are not directly subjected to the high temperature fluid that circulates in the expansion turbine, and in particular is understood to mean either the stator cavity made on the turbine box or the wheel space of the turbine.

The disc cavity or wheel space are understood to mean, in short, either the space between the stator structure and the support disk of the blades of the expansion turbine, or the space between a support disk and the adjacent disk; therefore it includes, in general, all the components or parts of the machine that are shown, see also the description below.

The working fluid is in general made by sucking air from the atmosphere into the compressor; the overheated working fluid, therefore, results in a mix of atmosphere air and combustion gas at high temperature.

In a particularly advantageous action pertaining to the invention, the regulation stage (e) has particular application and is activated when the pressure of the first tapping is insufficient for producing a flow of fluid strong enough to cool down the cavity, whether it is due to a fault of the specific installation or due to particular atmosphere conditions, such as, for example, when only a small part of the distributable power is required, or when sudden atmosphere thermal ranges are presented or during the start-up of the machine, etc.

In particular, note that in some industrial applications there is a gas turbine specifically designed to work constantly on full load, to provide the maximum quantity of energy available in a widely constant outtake, such as the turbine used to guide electric generators. In this case the operation conditions largely correspond to the conditions during the start-up or the turning off of the machine or incidental extemporary machine blockage.

On the other hand, in other industrial applications, turbines are designed specifically to work not at full load to supply variable quantities of energy outtake, such as the turbines used as aero motors or for activating a machine at variable load (a compressor or otherwise).

Following a beneficial form of action, a further stage is in place for constantly and directly monitoring the temperature of the first cavity, that is, through the temperature disposed in appropriate position at the inside of the same vane, or directly, that is, through one or more reference thermodynamic parameters, the temperature and/or the pressure from the axial compressor, the temperature of the unloaded gas, the power of the machine, the load of the machine as well as the inclination of any differently shaped blades within the compressor or elsewhere.

Following another aspect, the present invention concerns a cooling system for a gas turbine; the invention also concerns a gas turbine comprising: a first duct suited to carry out a first tapping of the compressed working fluid from the compressor to feed it into at least a first cavity for cooling; a second duct suited for carrying out a second tapping of the working fluid downstream from the first tapping to feed it into at least a second cavity of the turbine, arranged upstream from the first cavity, for cooling; a fluid-dynamic system suited for combining the first tapping to the second tapping to selectively increase the flow of the first tapping during partial load operation conditions to keep its temperature at least in the first cavity within the acceptable limits for the resistance of the materials; and a control system electronically connected to the fluid-dynamic system to selectively feed a part of the second tapping into the first duct during partial load operation conditions thanks to the monitoring of operation parameters, to keep the temperature of the first cavity within the acceptable limits for the resistance of the materials.

The control system is beneficial as is able to directly monitor the temperature of the first cavity, that is, through the temperature sensors arranged in the appropriate position inside of the same vane, or directly, that is, through one or more reference thermodynamic parameters, the temperature and/or the pressure of the axial compressor, the temperature of the unloaded gas, the power of the machine, the load of the machine, as well as the inclination of any differently shaped blades in place within the compressor or elsewhere.

Preferably, the above-mentioned fluid-dynamic system is carried out by means of an ejector fluidly associated to the first duct and a connection duct with a connection valve appropriate for fluidly connecting the ejector with the second duct. The ejector is advantageously and preferably suited for creating a depression such that increases the flow of fluid from the first duct thanks to a sudden expansion of the fluid proceeding from the second duct; the ejector is moreover preferably suited for directing the flow substantially towards one direction or to stop the reflux or recirculation of the fluid by entering the first duct.

Note that the second tapping is made downstream from the first tapping in the compressor, so the pressure of the first tapping is inferior to that of the second; in the same way, at least a second cavity is arranged upstream from the first cavity in the expansion turbine, for which the second cavity is placed in an area of the turbine at higher temperature with respect to that of the first cavity. Therefore the first cavity at lower temperature is cooled with the first tapping at lower pressure, whilst the second cavity at higher temperature is cooled with the second tapping at higher pressure, in this way there is an optimization of the performance of the machine.

Following another aspect, the present invention concerns a gas turbine comprising a cooling system of the type described above.

An advantage of the present invention is given by the fact that it is possible to effectively cool the first cavity whether during operation conditions at full load or during operation conditions at very low partial load, that is, when the pressure of the first tapping is not sufficient to guarantee an effective cooling at the first vane. Another advantage is that it is possible to effectively cool the cavity of the expansion turbine in conditions of minimum lowest flow (of fluid in the compressor) with respect to that of the current machine.

Following particular actions, it is possible to implement this cooling system on both new and existing machines, easily and at a reasonable cost, limiting the installation of further instrumentation or new sensor systems.

Definitively, this method and cooling system allow for an extremely reliable and versatile regulation of the cooling fluid as well as the perfected and meticulous optimization of the performance of the machine according to its operating conditions and/or atmospheric conditions.

Further advantageous features and ways of carrying out the method and the device following the invention are indicated in the attached claims and will further be described in the following sections with reference to some examples of non restrictive actions.

BRIEF DESCRIPTION OF THE DRAWINGS

The present invention may be further documented and its numerous purposes and advantages will become obvious to the experts in the field with reference to the attached schematic drawings, which show a practical exemplification restricted to what is found therein. In the drawings.

DETAILED DESCRIPTION OF THE INVENTION

Figure 1A:
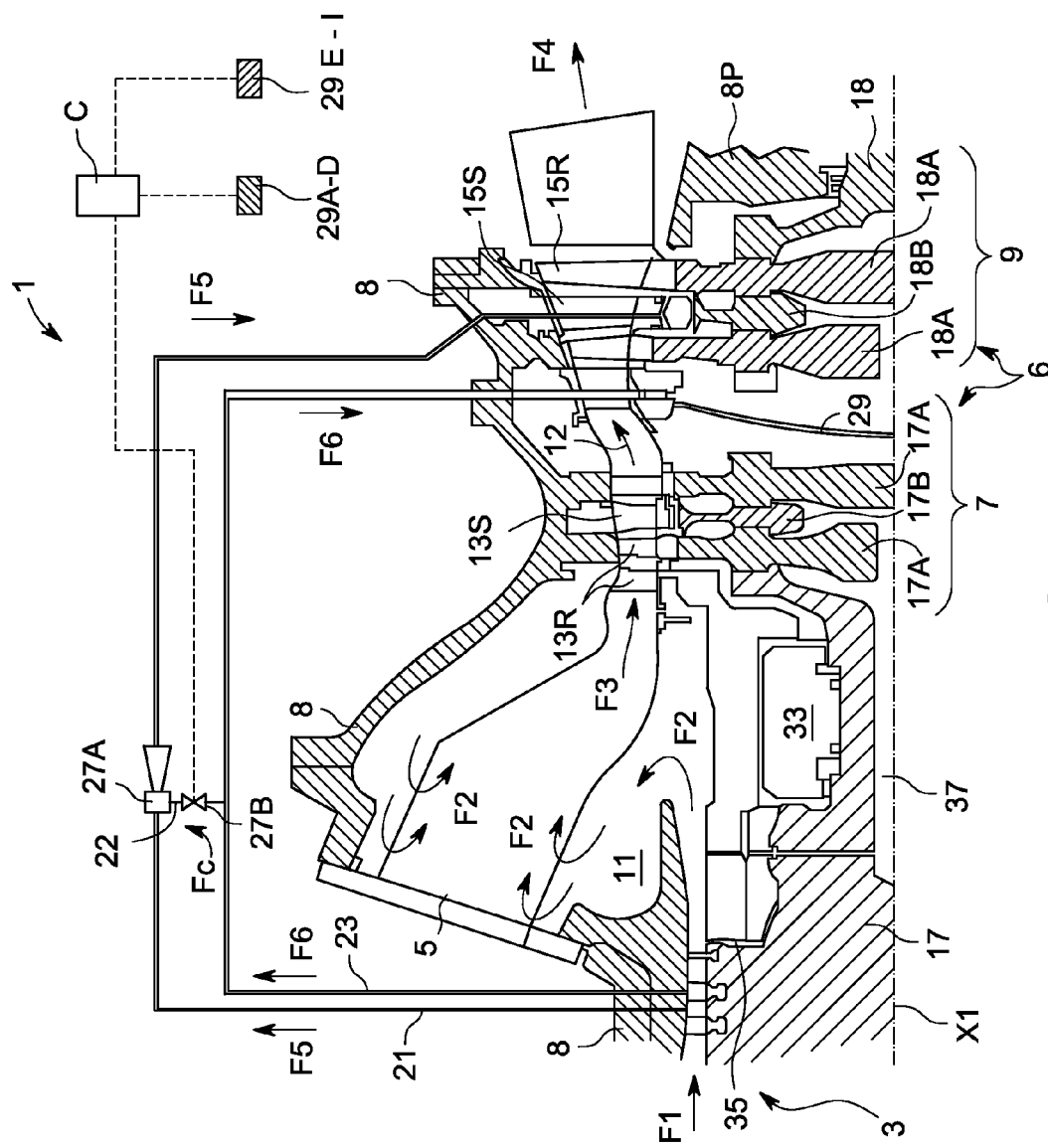
FIG. 1A is a schematic view in longitudinal section of a part of a machine following a form of action of the invention.

In the drawings, in which the same numbers correspond to the same parts in all the different figures, a turbine is indicated with 1, see FIG. 1A, and comprises—in its main features—an axial compressor 2, several combustion chambers 5 (of which a single one is shown in the Figure for the sake of simplicity) and an expansion turbine 6, formed by a first part called at high pressure 7 and a successive part at low pressure 9, enclosed in a pressurized box 8, eventually formed by one or more shells associated between them.

Air from the atmosphere comes in (see arrow F1) in an intake upstream from compressor, in which it is compressed to then be fed (arrow F2) in the combustion chamber 5 through the appropriate channeling 11; in combustion chamber 5 the compressed air reacts with a combustible to form a hot gas, typically at around 1000-1300° C. The hot gas is fed (arrow F3) into the expansion turbine at high pressure 7 and successively to the low pressure turbine 9 along a course of expansion—indicated generically with 12—where it expands transforming its own thermal energy into mechanical energy; at last, the expanded gas comes out of the machine (F4).

Expansion turbine 7 at high pressure in general is composed by one or more rotor 13R and stator 13S blades and activates compressor 3 through a first rotating shaft 17 around an axle X1; the expansion turbine 9 at low pressure is composed also of one or more rotor 15R and stator blades 15S (see also FIG. 2) and activates an external machine (generally, but not limited to, an electricity current generator or a compressor, not shown in the figure for the sake of simplicity) through a second shaft 18 coaxial to the first 17. It is obvious to the experts in the field that it is possible to place a single continuous shaft instead of first and second shaft 17, 18 therein described according to the particular machine made.

The rotor blades 13R of the expansion turbine 7 are mechanically connected to shaft 17 by respective fitted rotating discs 17A whilst the stator blades 13S are associated sealed from their respective fitted stator discs 17B are fitted together with shaft 17; discs 17A and 17B are arranged alternating each other and solidly coupled together to form a single rotating piece. In the same way, rotor blades 15R of low-pressure expansion turbine 9 are mechanically connected to shaft 18 by respective fitted rotating discs 18A. The stator blades 15S of turbine 9 are in turn associated sealed from their respective fitted stator discs 18B fitted together with shaft 18; discs 18A and 18B are arranged alternating each other and solidly coupled together. See also the description below.

Also note that in general seals are in place between disks 17A, 17B and 18A, 18B, blades 13K, 13S and 15S, 15R and box 8 to isolate as best as possible the gas along the course of expansion 11, to increase the performance of the machine, as is well known by experts in the field.

Following an advantageous action of the invention, a first duct 21 with a fluid-dynamic device 27A are in place (see also the descriptions in reference to FIG. 1B), this duct 21 being appropriate to carry out a first tapping of the compressed working liquid from compressor 3 to feed into a first cavity S1; a second duct 23 suited for carrying out a second tapping of the working liquid from compressor 3 downstream from the first tapping to feed into a second cavity S2 and S3 upstream from the first cavity S1, for cooling; and a connecting duct 22 with a connecting valve 27B fitted to fluidly connect the fluid-dynamic device 27A and the second duct 23.

A control system C is electronically connected to valve 27B to selectively feed a part of the second tapping into the first duct 21 during particular operation conditions to keep the temperature of the first cavity S1 within the acceptable limits for the resistance of the materials.

FIG. 1A also shows a mechanical support pad 33 for the rotating shaft 17 and a thermal protector 29 that is generally foreseen to divide the high pressure expansion turbine 7 from the low pressure turbine 9 according, substantially, to the pressure of the gas along the expansion course 11. This protector 29 can be left out, when the project specifications do not require it.

Now, this Figure shows a channel 35 that fluidly connects the flow from compressor 3 to a vane 37 drawn coaxially within shaft 17, in turn in fluid connection with the rotating spaces of the high pressure expansion turbine 7 for constant cooling through the part of working fluid that is intercepted in channel 35 (arrow F9) without any type of regulation or control. However, any number of cooling systems known may be used in combination with the present invention and they are not represented here for the sake of simplicity.

Figure 1B:
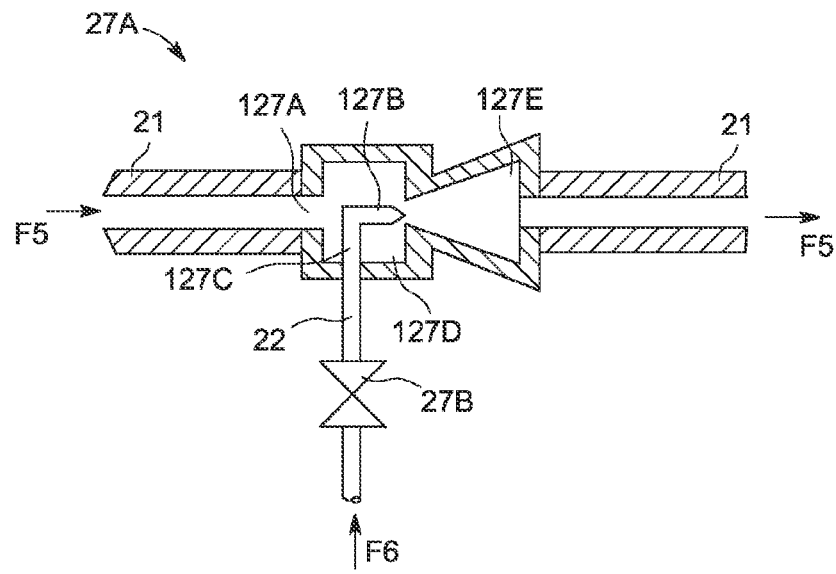
FIG. 1B shows a schematic section of a device provided in the making of FIG. 1A.

FIG. 1B schematically describes a fluid-dynamic device 27A of the type to eject comprising a suction inlet 127A, a nozzle 127B, a motor fluid inlet 127C, a vapor chamber 127D and a diffuser 127E.

In brief, duct 21 feeds (arrow F5) in the ejector 27A the fluid of the first tapping, connecting duct 22 feeds (arrow Fc) the liquid of the second tapping through ejector 27A when valve 27B is open. The fluid of the second tapping presents in general a quantity of motion (or in other terms a pressure) higher than that of the fluid from the first tapping by which the quantity of motion (or pressure) coming out from the ejector is elevated at an intermediate value with respect to the pressure of the first and second tapping. Furthermore, ejector 27A stops the fluid from returning to compressor 3 passing from the first duct 21 thanks to its structure.

Figure 2:
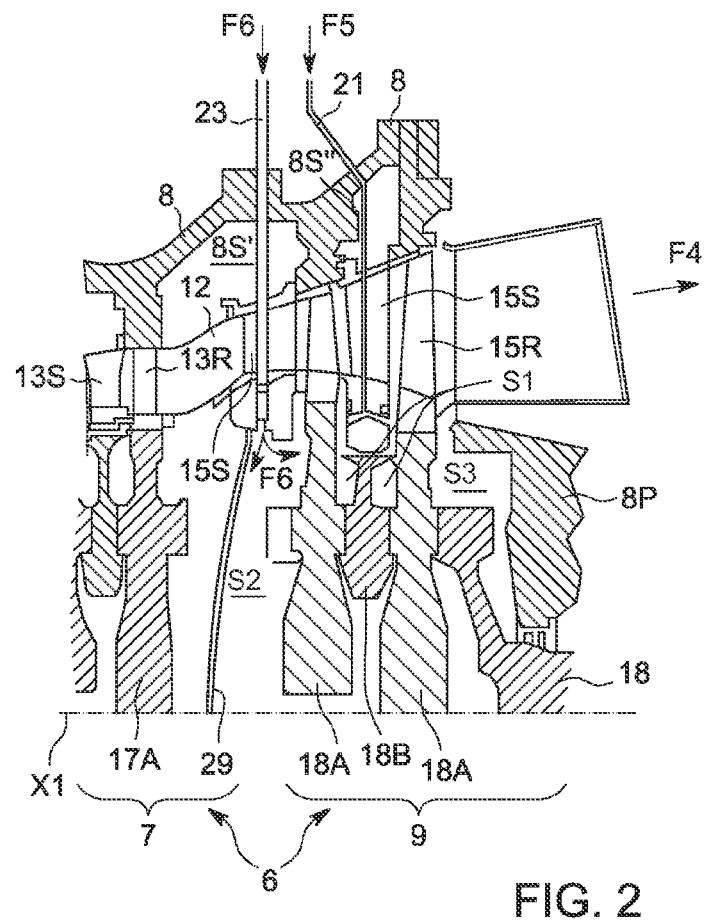
FIG. 2 shows a magnified detail of FIG. 1A.

Evidently, this ejector 27A is therein represented by way of example—this device may be of any other type suited for the purpose. FIG. 2 shows an enlargement of expansion turbine 9 of FIG. 1A in which is noticed in particular the first wheel space S1 formed between the first rotating disc 18A and the second rotating disk 18A (interposed between them is the first stator disc 18B); the second wheel space S2 formed between thermal protector 29 and the first rotating disk 18A; and a third or last wheel space S3 in turn formed between the second rotating disk 18A and box 8. Wheel spaces S1-S3 are enclosed within lateral walls of box 8.

Following the form of action described, the first duct 21 passes through a second stator blade 8S" drawn in box 8 and successively the second stator blade 15S to be introduced into a second and in a third wheel space S2 and respectively S3 of the expansion low pressure turbine 9; the second duct 23 goes through a first stator blade 8S' drawn in box 8, then through the first stator blade 15S to be introduced into the first wheel space S1 of the same turbine 9.

Obviously, the shape of box 8, of stator blades 8S' and 8S", of blades 13R, 13S and 15R, 15S of wheel space S1, S2 and S3 are represented by way of example, and can be placed in different numbers and forms according to the specification requirements for construction or use, for example, stator blades 8S' and 8S" cannot be presented and therefore blades 18S' and 16S" can be fixed directly onto box 8, channels 21 and 23 can also be arranged in a different number or otherwise.

Note that, in the making described, channels 21 and 23 do not provide openings to vane 8S' and respectively 8S", not however excluding that they may be foreseen to feed at least part of the cooling fluid into the respective vane.

Favorably, a first sensor 29A (see FIG. 3) is placed in the second wheel space S2, in such a position to raise its maximum temperature, preferably in proximity to the same blade 15S; a second and a third sensor 29B and 29C are placed within the same blade 15S; a second and a third sensor 29C and 29C are placed within the first vane wheel space S1, this one also in such a position to raise the maximum temperature during the operation of the machine and a fourth sensor 29D is placed in an adequate position within wheel space S3. These sensors 29A-29D are electronically connected and monitored from control unit C (see also FIG. 1A). In this way, control unit C is able to monitor temperature variations in wheel spaces S1-S3 directly and in real time, and operate valve 27B when needed.

Figure 3:
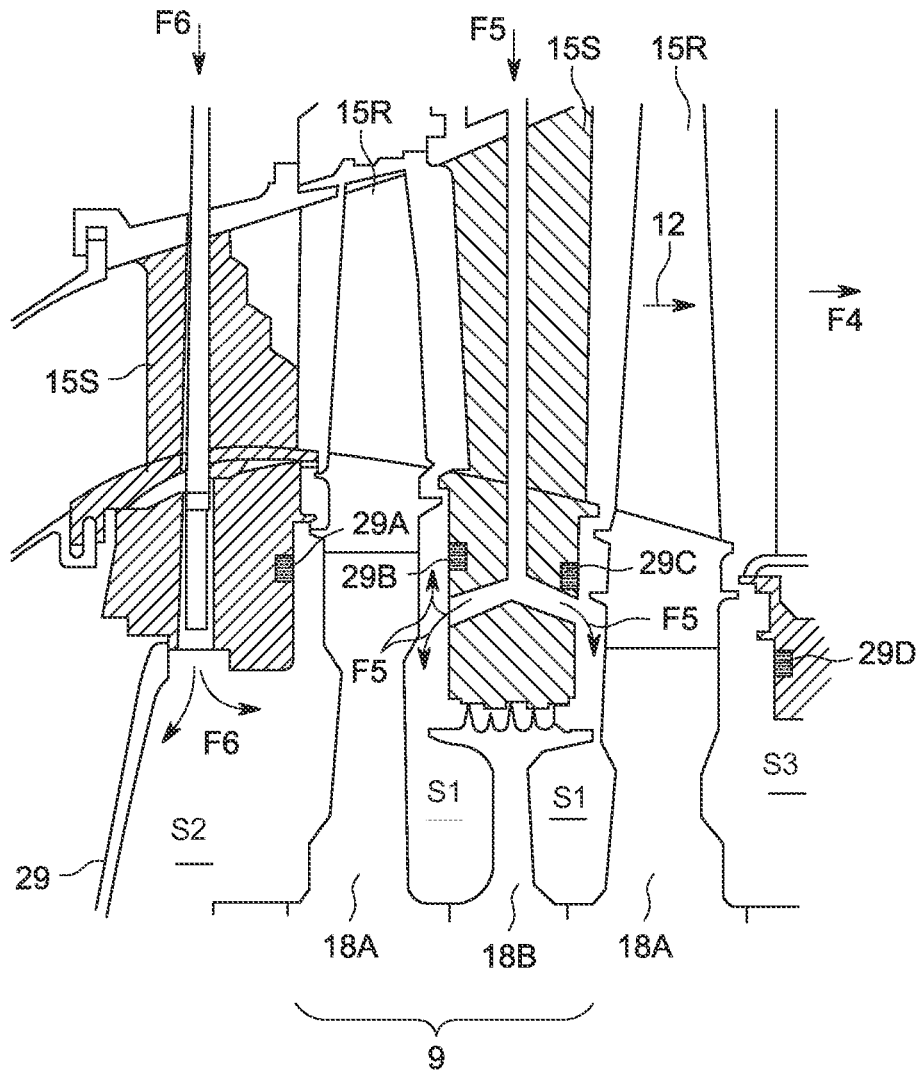
FIG. 3 shows a magnified detail of FIG. 2.

In another advantageous form of implementation, it is possible to provide for monitoring the temperature of each wheel space S1-S3 indirectly by means of one or more sensors suited for measuring one or more reference thermodynamic parameters, such as a sensor for external temperature 29E, a sensor 29F for temperature and/or pressure from axial compressor 3, a sensor 29G for temperature of the gas from the machine's waste pipe, a sensor 29H for the power of the machine, a sensor 29I for measuring the load of the machine, or monitoring—not shown in the Figure—the inclination of differently shaped blades—not shown in the Figure for the sake of simplicity—put inside compressor 3 or another. In this case, control unit C receives the data from sensors 29E-29I from which it draws the variations in temperature of wheel spaces S1-S3 for the purposes of operating, on demand, valve 27B. It does not exclude being able to provide for a number and/or a typology other than sensors 29A-29I or being able to use at least some of the sensors traditionally installed in the particular turbine 1. FIG. 3 shows in particular the stator blade 15S presented with an inferior extremity that is associated sealed from the superior extremity of the first stator disc 18B by means of a traditional labyrinth sealant 31; rotor blade 15R presents part flaps to limit the passage opening, between each wheel space S1-S3 and expansion channels 12, through which in general the cooling air is discharged.

In stator blades 8S' and 8S" there are joint or fixed areas outside of box 8, are not in direct contact with the process gas and can be given a mechanical seal system—not shown in the Figure for the sake of simplicity—which avoids or limits any intake of hot gas; these stator blades 8S' and 8S" can therefore provide for independent cooling systems. This does not exclude that the present invention be applied for cooling at least in part also these stator blades 8S' and 8S"—as noted above—according to particular applications or needs.

In particular, the cooling system following the present invention can be implemented following different and countless configurations as a way of cooling other cavities of the expansion turbine that are not directly subjected to the high-temperature fluid that circulates in expansion course 12. The form of implementation shown in reference to FIG. 2 and FIG. 3 is in fact described by way of example and does not limit the invention to this function. For example, channels 21 and/or 23 can fluidly connect and directly cool other stator blades, or more channels 21, 23 can be provided for cooling different cavities in the machine, or particular fluid-dynamic courses can be provided for cooling more cavities using a single current of fluid, etc.

The operation of the cooling system following the invention provides for channels 21 and 23 feeding independently a cooling fluid in the respective blades S1, S2, S3 if the machine works at high load operation conditions, or better when the pressure of the fluid in duct 21 and sufficiently high of efficiently cooling vane S1. On the other hand, when the machine works at partial load operation conditions, or when the pressure of the fluid in duct 21 is insufficient to effectively cool vane S1, channel 23 is fluidly connected to channel 21 through the devices described above.

The above partial load operation conditions may be implemented when the distributed power of the machine is reduced to comply with operation specifications or alternatively, when significant variations of atmosphere conditions (for example between day and night in particular areas of the globe), etc. In these cases, the cooling system regulates the flow of cooling fluid to keep the temperature of all wheel spaces S1-S3 within the allowed values.

The cooling system described above is preferably implemented in combination with cooling known to obtain a particularly effective machine, with performance and high thermal efficiency, such as rotor blades' and stator blades' cooling systems and those for mechanical bearings.

Moreover, if the system described therein is claimed, it can also be implemented in combination with the traditional cooling systems for wheel spaces, which provide for the inflow of a constant amount of cooling air according to particular applications.

Obviously, it is possible to join one or more cooling devices in the cooling circuit or implement different control methods for the perfected and scrupulous optimization of the performance and the considerable increase of the useful life of the components of a machine.

The purpose of the illustrations is to represent only possible forms of action; these do not limit the invention, which can vary in form and dispositions without departing from the base concept of the invention. The presence of reference numbers in the attached claims is only for the purpose of facilitating the reading in the light of the descriptions that precede and of the attached drawings and does not in any way limit the scope of protection.

What is claimed is:

1. A cooling system for a gas turbine comprising:
a first duct configured to feed a compressed working fluid from a first tapping of the compressed working fluid from a compressor to a first cavity for cooling of an expansion turbine;
a second duct configured to feed the compressed working fluid from a second tapping of the compressed working fluid of the compressor to a second cavity for cooling of an expansion turbine, wherein the second duct is at a higher pressure than the first duct, and wherein the second tapping is downstream from the first tapping;
a fluid dynamic system comprising an ejector directly coupled to the first duct, the ejector configured to prevent the working fluid from returning to the compressor;
wherein the fluid-dynamic system is configured to selectively combine the working fluid from the first tapping to the working fluid of the second tapping to selectively increase the flow of the working fluid of the first tapping during partial load operation conditions to keep the temperature at least in the first cavity within acceptable limits for the protection of the materials of the gas turbine therearound; and
a control system electronically connected to the fluid-dynamic system configured to selectively feed a part of the working fluid from the second tapping into the first duct during partial load operation conditions, based on the monitoring of operating parameters, to keep the temperature of the first cavity within the acceptable limits for the protection of the materials of the gas turbine engine therearound.

2. The cooling system of claim 1, further configured to directly or indirectly monitor the temperature in at least the first cavity for cooling of the expansion turbine.

3. The cooling system of claim 1, wherein the ejector is fluidly associated to the first duct and a connecting duct with a connection valve configured to fluidly connect the ejector with the connector duct.

4. A gas turbine comprising the cooling system of claim 1.

* * * * *